United States Patent [19]

Avery et al.

[11] Patent Number: 5,022,994
[45] Date of Patent: Jun. 11, 1991

[54] FLUID TREATMENT SYSTEM

[75] Inventors: Norman R. Avery, Chesterland; Dale J. Spangenberg, Jr.; Jimmy D. Buth, both of Chardon; Kenneth C. Seuffer, Jr., Middlefield, all of Ohio

[73] Assignee: Kinetico Incorporated, Newbury, Ohio

[21] Appl. No.: 334,453

[22] Filed: Apr. 6, 1989

Related U.S. Application Data

[63] Continuation-in-part of Ser. No. 156,300, Feb. 16, 1988, abandoned.

[51] Int. Cl.$^5$ .............................................. B01D 15/04
[52] U.S. Cl. ................................... 210/670; 210/746; 210/88; 210/96.1; 210/98; 210/141; 210/143; 210/190; 210/269; 137/624.12; 137/624.14; 251/59
[58] Field of Search ............... 210/140, 141, 142, 143, 210/190, 191, 264, 269, 670, 746, 87, 88, 89, 96.1, 98, 103, 105; 137/624.12, 624.14, 624.18; 251/59

[56] References Cited

U.S. PATENT DOCUMENTS

| | | | |
|---|---|---|---|
| 2,617,766 | 11/1952 | Emmett et al. | 210/96.1 |
| 2,938,868 | 5/1960 | Carlson et al. | 210/662 |
| 3,676,336 | 7/1972 | O'Brien et al. | 210/87 |
| 3,891,552 | 6/1975 | Prior et al. | 210/88 |
| 4,298,025 | 11/1981 | Prior et al. | 137/624.14 |
| 4,426,294 | 1/1984 | Seal | 210/89 |
| 4,427,549 | 1/1984 | Brown et al. | 210/662 |
| 4,469,602 | 9/1984 | Seal | 210/89 |
| 4,470,911 | 11/1984 | Reinke et al. | 210/89 |
| 4,490,249 | 12/1984 | Seal | 210/89 |
| 4,764,280 | 2/1988 | Brown et al. | 210/662 |

Primary Examiner—Richard V. Fisher
Assistant Examiner—Christopher Upton
Attorney, Agent, or Firm—Watts, Hoffman, Fisher & Heinke Co.

[57] ABSTRACT

A method and apparatus for controlling a fluid treatment apparatus that includes a resin tank containing an ion exchange media. A control valve controls the regeneration cycle and includes a regeneration control turbine operatively connected to a regeneration control disk forming part of a servo system. During regeneration, a meter flow of fluid emitted by a regeneration control nozzle produces rotation in the turbine to effect a regeneration sequence. Regeneration is initiated by a regeneration initiating nozzle which emits a stream of fluid at the turbine for a predetermined time interval in order to initiate a regeneration cycle. A control system includes a sensor for monitoring the fluid quality level of the source fluid or the treated fluid and initiates regeneration. When the control system is used with the disclosed control valve, the control system communicates presssurized fluid to the regeneration initiating nozzle upon sensing a predetermined quality level. The control system preferably includes a programmable controller interconnected with a flow sensor and conductivity sensor and periodically samples the conductivity of the influent. Based on the conductivity and volume date provided by the sensors, the programmable controller maintains a running total of "total grains" processed by the ion exchange material. When the total grains processed equals or exceeds a preset value which is related to the capacity of the resin bed, the control system initiates regeneration.

27 Claims, 9 Drawing Sheets

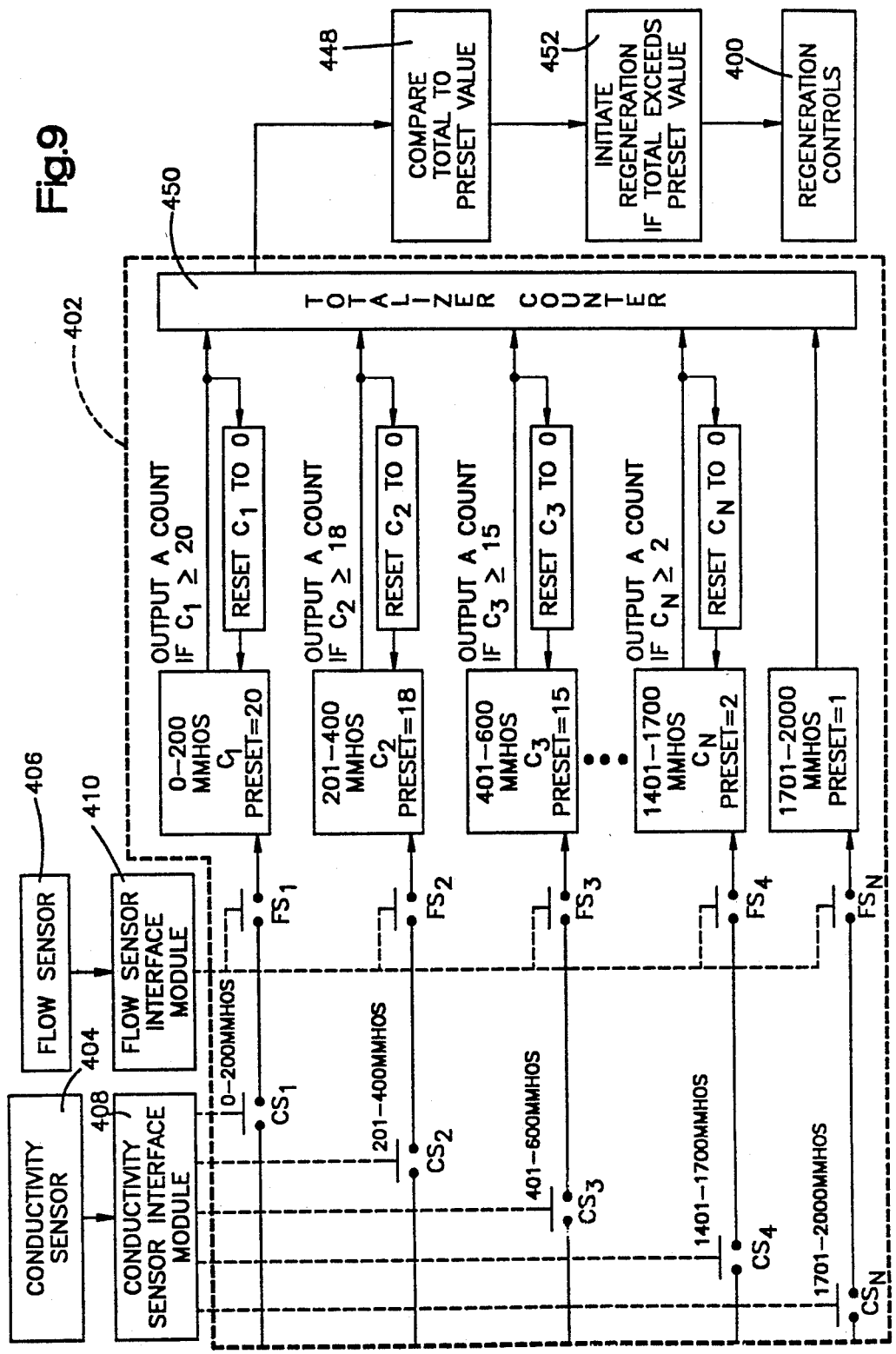

FLUID TREATMENT SYSTEM

This application is a continuation-in-part of application Ser. No. 07/156,300, filed Feb. 16, 1988, now abandoned.

TECHNICAL FIELD

The present invention relates generally to fluid treatment and in particular to an improved control system and control device for controlling a fluid treatment apparatus.

BACKGROUND ART

U.S. Pat. No. 4,298,025, which is owned by the present assignee, discloses a control valve for use in water softeners having two resin tanks. One of the resin tanks is normally on-line while the other tank is regenerated and placed in a standby condition until the first tank requires regeneration. The disclosed control valve controls which of the tanks is on-line and controls the regeneration sequence of an exhausted tank.

The quantity of water treated by a given tank, is monitored by a mechanism that includes a water usage turbine driven by water entering the on-line resin tank. When a predetermined quantity of water is treated, which produces to a predetermined number of revolutions in the turbine, a regeneration sequence is initiated which places the standby tank on-line and isolates the exhausted tank.

A second turbine, operatively connected to a regeneration sequence control element (in the form of a disk) is rotated by a stream of water that is activated at the beginning of the regeneration cycle. The stream of water physically drives the regeneration control disk (via the turbine and associated drive train) through its sequence. With the disclosed arrangement, the frequency of regeneration of the water softener system is determined by the usage turbine which directly measures the quantity of fluid treated by a given tank.

In U.S. Pat. No. 4,427,549 which is also owned by the present assignee, a deionization method and apparatus is disclosed. The disclosed apparatus includes a control valve similar to the control valve disclosed in U.S. Pat. No. 4,298,025 in that it includes a usage turbine for monitoring the amount of source water treated by a given tank and a regeneration control turbine for driving a control element through a regeneration sequence.

In U.S. application Ser. No. 083,721 filed Aug. 10, 1987 under the title Apparatus and Method for Recovering Materials from Process Baths, a method and apparatus for recovering a metal such as nickel from a plating bath is disclosed. A control valve similar in function to the control valve disclosed in U.S. Pat. Nos. 4,298,025 and 4,427,549 can be used to control an apparatus embodying the invention of U.S. Ser. No. 083,721, if a pair of resin tanks are employed, one of which is on-line, the other of which is regenerated and held off-line.

In all three of the above described fluid treatment and related applications, the regeneration frequency is determined by a quantity of fluid treated by the system. In selecting the frequency (i.e., the quantity of fluid to be treated before regeneration is necessary), it is assumed that the characteristics of the fluid to be treated remain fairly constant. In case of a water softener system, it is assumed that the water to be softened contains a fairly constant concentration of minerals to be removed. In the case of a deionization system, it is assumed that the incoming fluid has a fairly constant concentration of cations and anions. In the case of a metal recovery system, it is assumed that the fluid being processed has a fairly constant concentration of the metal to be recovered.

As a practical matter, however, in some applications the characteristics of the incoming fluid vary. As a result, the frequency of regeneration, as determined by the water usage turbine, may be excessive resulting in the waste of regeneration chemicals, or may occur at insufficient intervals which cause the quality of the output fluid to degrade.

Systems have been suggested in which the frequency of regeneration of an ion exchange bed is a function of a monitored characteristic or parameter in the output fluid. For example in U.S. Pat. No. 2,938,868 which issued to Carlson et al., a method of controlling regeneration of ion exchangers is disclosed that includes an apparatus for monitoring the output of a deionization apparatus. In the system disclosed in this patent, the pH or alternately, the conductivity of the effluent is monitored and when the pH (or the conductivity) of the effluent reaches a predetermined level, regeneration of the anion and/or cation beds is initiated.

In many industrial applications which use deionized water, relatively high quality water is required and the high quality level must be maintained throughout the operation of the deionization system. It has been found, that by monitoring the effluent, the quality of the output must degrade at least slightly in order for the system controller to recognize that regeneration is required. It has also been found that it is desirable to regenerate a resin bed before it is fully exhausted. By regenerating a resin bed prior to complete exhaustion, it has been found that extremely high-quality deionized water can be maintained throughout the operation of the deionization apparatus. Devices that rely on the degradation in quality of the output stream in order to effect regeneration of the resin bed have proved unsatisfactory in those applications that require high quality deionized water.

DISCLOSURE OF INVENTION

The present invention provides a new and improved method and apparatus for controlling a fluid-treatment process such as a deionization system or water softener. According to one aspect of the invention, the method and apparatus includes a pair of resin tanks, one of which is on line while the other is regenerated and held in a stand-by condition. According to this aspect of the invention, a control valve is disclosed which includes a mechanism for externally initiating a regenerating sequence independent of the quantity of fluid treated by the system.

According to another aspect of the invention, the method and apparatus for controlling the fluid treatment process includes a feed forward controller that monitors a characteristic or parameter of the incoming fluid to be treated (influent) and based on this monitored characteristic, determines when regeneration of a resin bed is necessary.

According to the first mentioned aspect of the invention, the control valve includes valving for controlling the fluid communication between a pair of resin tanks and a source of fluid to be treated as well as the intercommunication between the tanks. The control valve also controls the regeneration process for an exhausted resin tank. The disclosed valve includes features that are similar to those forming part of the control valves described in U.S. Pat. Nos. 4,298,025 and 4,427,549 which are hereby incorporated by reference.

In the disclosed and preferred embodiment of this aspect of the invention, the control valve includes a regeneration control turbine which drivingly engages a regeneration control disk that in turn sequences an exhausted resin tank through a regeneration cycle. In the control valve disclosed in the above identified patents, a water usage turbine, drivingly connected to a water usage control disk, is used to initiate movement in the regeneration control disk. A small initial movement in the regeneration control disk, effected by the water usage disk, activates a metered flow of treated fluid directed against the regeneration control turbine. This metered flow of fluid continues to drive the regeneration control disk through its predetermined range of movement to effect the regeneration sequence.

In the present invention, a regeneration initiating nozzle, connected to a source of fluid, is disposed in a regeneration turbine chamber and is positioned to direct a fluid stream at the turbine. An actuating device controls the communication of fluid to this nozzle. In the preferred and illustrated embodiment, a control circuit including a sensor or sensors and fluid valve are used to control the communication of fluid to the nozzle.

When the disclosed valve is used in a water softening apparatus, a sensor may be utilized to monitor the quality of water leaving the water softener and when a quality level below a predetermined minimum is sensed by the sensor, a valve would be actuated which would communicate fluid under pressure to the nozzle. As discussed above, the fluid stream emitted by the nozzle would rotate the regeneration control turbine to effect initial movement in the regeneration control disk. Once the control disk has moved a predetermined distance, a metered flow of fluid is directed against the regeneration control turbine by a regeneration control nozzle and hence the regeneration control sequence proceeds to completion.

In one preferred embodiment of the control system for determining when regeneration of an ion exchange bed, the quality of the treated fluid (effluent) is monitored. When the quality level of the effluent changes as evidenced by a change in conductivity and or pH, the control system initiates and/or effects regeneration of the exhausted resin bed.

In another preferred and illustrated embodiment, the control system for determining the frequency of regeneration monitors the incoming fluid (influent). According to this embodiment, the control system monitors a characteristic of the fluid that is indicative of the total dissolved solids (TDS) level of the fluid stream. Using this information, the control system maintains total count of the "grains" conveyed by the influent to the resin bed. The control system initiates regeneration of the ion exchange bed when a predetermined number of "grains" have been conveyed by the influent to the bed. In effect, the control system exerts feed-forward control in that the quality level of the output of the water-treatment device is not monitored or if monitored, is not used to control the regeneration frequency. With the disclosed embodiment, the "total predetermined grains" that is sufficient to trigger regeneration, is chosen to be a level at which the resin bed is not totally exhausted. As a result, a "virgin" resin portion is maintained in a resin tank. When used in a counter-flow regeneration system, it is has been found that by maintaining virgin resin at the foot of the tank, high-quality water is maintained throughout the operation of the treatment device. It has been found that if a resin bed is run to complete exhaustion, the water quality after regeneration is lower than the quality level available in a system in which at least a portion of the resin is not run to exhaustion. This is especially true in a counter-flow regeneration type system.

When this embodiment of the invention is applied to deionization apparatus, the control system includes a conductivity sensor and a flow sensor disposed in the influent flow path. A controller receives data from the flow sensor and conductivity sensor through associated interface devices and based on the data received, calculates and maintains a running total of dissolved solids received by the ion exchange bed. The running total is continuously or periodically compared with a preset value which corresponds to a maximum desired exhaustion level in the ion exchange bed. When the running total of the grains processed by the bed exceeds the preset value, regeneration of the ion exchange bed is triggered.

According to a feature of the invention, the calculation or totaling of grains conveyed by the influent to the ion exchange bed includes a compensation or load factor to compensate for the reduction in capacity of a resin bed that occurs when the concentration of total dissolved solids in the influent is high. It is known that the relationship between the volume of water treatable by a given resin bed versus the concentration of total dissolved solids in the water is not linear. As a result, if the concentration of total dissolved solids in the incoming fluid doubles, the capacity of the resin bed will be reduced by more than one half. Typically, a reduction in capacity of a resin bed in the range of 10–20% can be expected if the influent has an extremely high concentration of total dissolved solids.

According to the preferred and illustrated embodiment, a relatively inexpensive programmable controller is used to monitor the flow and conductivity sensors. According to the preferred method, a flow sensor continuously monitors the flow of fluid into the treatment system and at predetermined intervals (i.e. every ten gallons), the controller checks the conductivity sensor to determine the conductivity of the influent. The combination of the conductivity information and the volume of fluid treated by the system since the last conductivity check or sampling i.e. ten gallons, is used to calculate the numbers of grains that have been treated by the system. A load factor is applied to this number to compensate for the conductivity level. This number is sent to a totalizer which maintains a running total of the grains processed by the system. This number is then compared to a preset value and if the value has been exceeded, regeneration is initiated. As indicated above, the value is selected to be one such that regeneration is initiated prior to complete exhaustion of the bed i.e. prior to a time at which all ion exchange sites hold an ion. With this disclosed embodiment of the invention, a deionization system or a water softener can be controlled with such precision that extremely high-quality water can be maintained at the output even though the incoming water quality can vary substantially. The system does not rely on a break through point at the output of a resin tank in order to initiate regeneration. In addition, by maintaining "virgin" resin in the tank, high-quality water is maintained especially in a fluid treatment system that employs counter-flow regeneration.

When the disclosed control system is combined with regeneration control valve discussed above, a cost effective deionization system or water-softener system can be produced that can be used to continuously provide high-quality deionized or softened water for home or industrial use that is substantially immune to changes in the incoming source water.

With the present invention, the regeneration of an exhausted resin tank can be controlled directly by a sensor and associated control circuit which directly monitors the quality of fluid leaving the treatment apparatus or alternately monitors the influent and "calculates" when regeneration is required. In addition, when the disclosed control valve is used as part of the regeneration control, it can retain the water usage monitoring turbine and associated mechanism so that regeneration of an exhausted tank may proceed at predetermined intervals dependent on the quantity of fluid treated by the system and, in addition, have a regeneration cycle occur at shorter intervals should the characteristics of the incoming fluid change such that the resin is exhausted before the predetermined quantity of fluid is treated.

A fuller understanding will be obtained and additional features of the invention will become apparent in reading the following detailed description made in connection with the accompanying drawings.

BEST MODE FOR CARRYING OUT THE INVENTION

Figure 1:
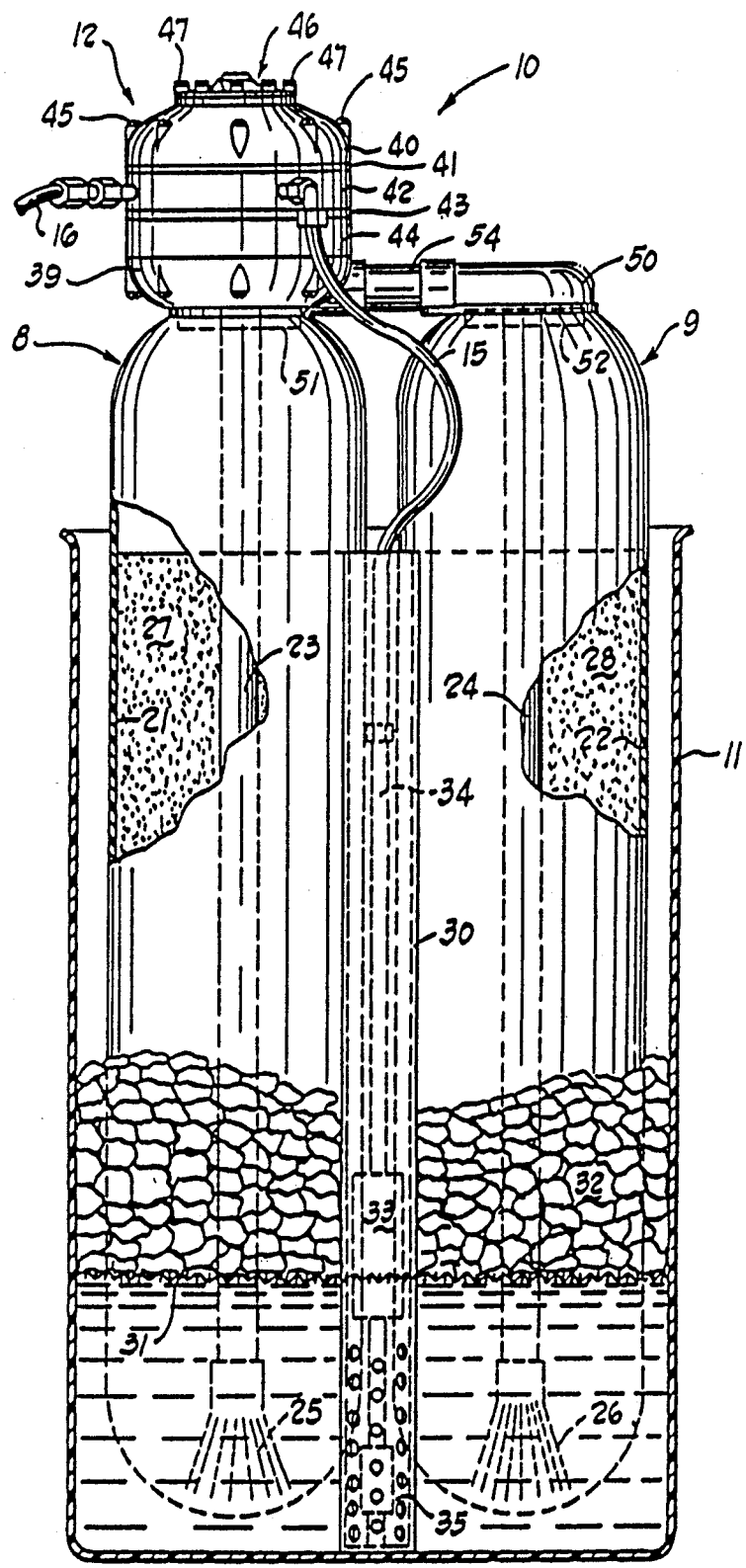
FIG. 1 is a side elevational view, partly in section, of a water softener employing a control valve of the present invention.

Referring to FIG. 1, a water softener 10 includes a pair of softener tanks 8, 9 positioned upright in an open-top brine tank 11. A valve assembly 12 is supported atop the tanks 1, 2. The valve assembly 12 is operative, as will be explained, to selectively maintain one of the tanks 8, 9 on-line with a household water supply system. The off-line tank is subjected to a regeneration cycle and then held off-line until the on-line tank is exhausted. The valve assembly 12 controls the regeneration process.

Figure 2:
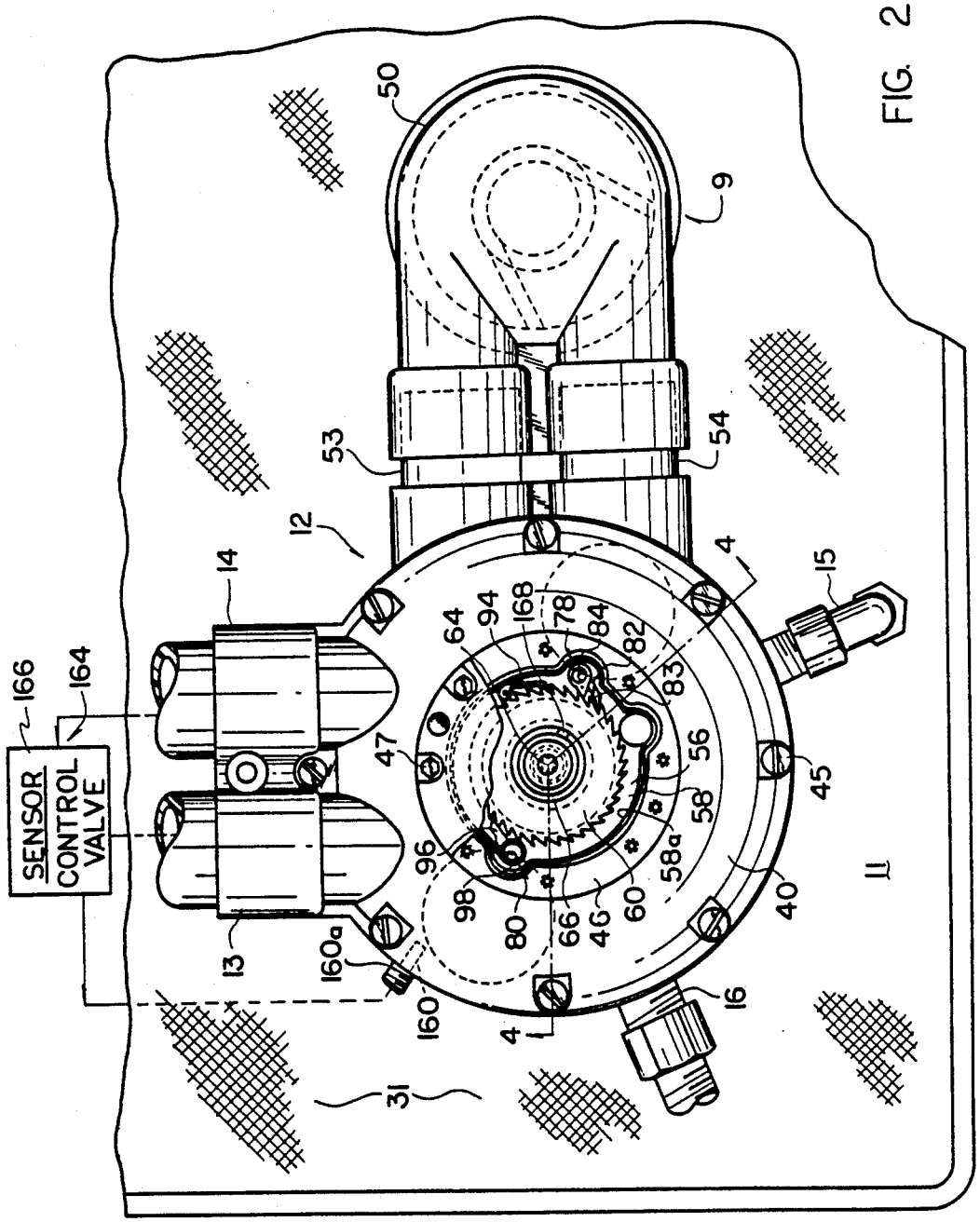
FIG. 2 is a plan view of the control valve with portions broken away to show interior detail.

Referring also to FIG. 2, four conduits communicate with the valve assembly 12. Hard water is delivered to the valve assembly 12 through an inlet conduit 13. Softened water is discharged from the valve assembly 12 through an outlet conduit 14. Brine from the brine tank 11 is admitted to the valve assembly 12 through a brine conduit 15. Waste water from the regeneration cycle is discharged from the valve assembly through a drain conduit 16.

The softener tanks 8, 9 are of known configuration and utilize common water softening chemicals. The tanks 8, 9 typically include cylinders 21, 22 of glass fiber construction which may be about 7 inches in diameter and 35 inches in length. The upper ends of the cylinders 21, 22 are threaded with female 2½ inch NPT threads for connection to the valve assembly 12. Riser pipes 23, 24 depend centrally through the cylinders 21, 22. A pair of screens 25, 26 communicate with the lower ends of the riser pipes, 23, 24. Suitable ion-exchange softening chemicals, indicated by the numerals 27, 28, are positioned in the cylinders 21, 22 surrounding the riser pipes 23, 24 and the screens 25, 26.

The water softening process takes place as water passes through the tanks 8, 9. Hard water is channeled into the cylinders 21, 22 and is softened during its passage downwardly through the chemicals 27, 28. Softened water enters the riser pipes 23, 24 through the screens 25, 26 and is directed back out of the cylinders 21, 22.

The brine supply system is of known configuration and may utilize common ion replacement salts to regenerate the softening chemicals 27, 28.

A screen 31 extends horizontally in the brine tank 11 in regions around the softener tanks 1, 2 and around the brine well 30. The screen 31 is positioned about six inches up the wall of the brine tank 11. Granular salt material 32 is deposited in the brine tank 11 and rests atop the screen 31.

A brine control valve 33 of known configuration is positioned in the brine well 30. The valve 33 includes a pipe 34 which is connected at its upper end to the brine conduit 15. The lower end of the pipe 34 communicates with a valve assembly 35 which serves the dual functions of admitting a regulated amount of brine solution from the brine well 30 to the pipe 34 when the water softener establishes a suction in the brine conduit 15, and of admitting a regulated amount of softened water to the brine well 30 from the pipe 34 when the brine conduit 15 is connected to a source of pressurized softened water.

The valve assembly 12 includes a stacked array of four disc-like members 41, 42, 43, 44 interposed between a base member 39 and a top member 40. Threaded fasteners 45 extend through aligned holes in the top and disc members 40-44 and are received in threaded holes formed in the base member 39 to clamp the members 39-44 together. A cover assembly 46 overlies portions of the top member 40 and is held in place by threaded fasteners 47.

A tank connector 50 is provided to the right of the base member 39 as viewed in FIGS. 1 and 2. Threaded depending necks 51, 52 are formed on the base member 39 and on the tank connector 50 for connection with the softener tanks 8, 9. A pair of conduits 53, 54 establish communication between the base member 39 and the tank connector 50. Hard water is delivered from the base member 39 through the conduit 53 and through the tank connector 50 to the softener tank 9. Softened water from tank 9 is returned through the tank connector 50 and through the conduit 54 to the base member 39.

Except for the disc member 40 and its associated components, the construction and operation of the remaining portions of the valve assembly 12 are substantially identical to that disclosed in U.S. Pat. No. 3,891,552, which is hereby incorporated by reference. By way of summary, the stacked members 41, 42, 43, 44 and base member 39, together house a plurality of servo valves which control the communication of the tanks 8, 9 with the brine solution in the tank 11 and with the inlet and outlet conduits 13, 14. Movement in the servo valves is achieved by the selective application of pilot pressures to piston chambers associated with each servo valve. The communication of these pilot pressures to the piston chambers is determined by a servo control mechanism housed in the member 40 that is constructed in accordance with the present invention.

Figure 3:
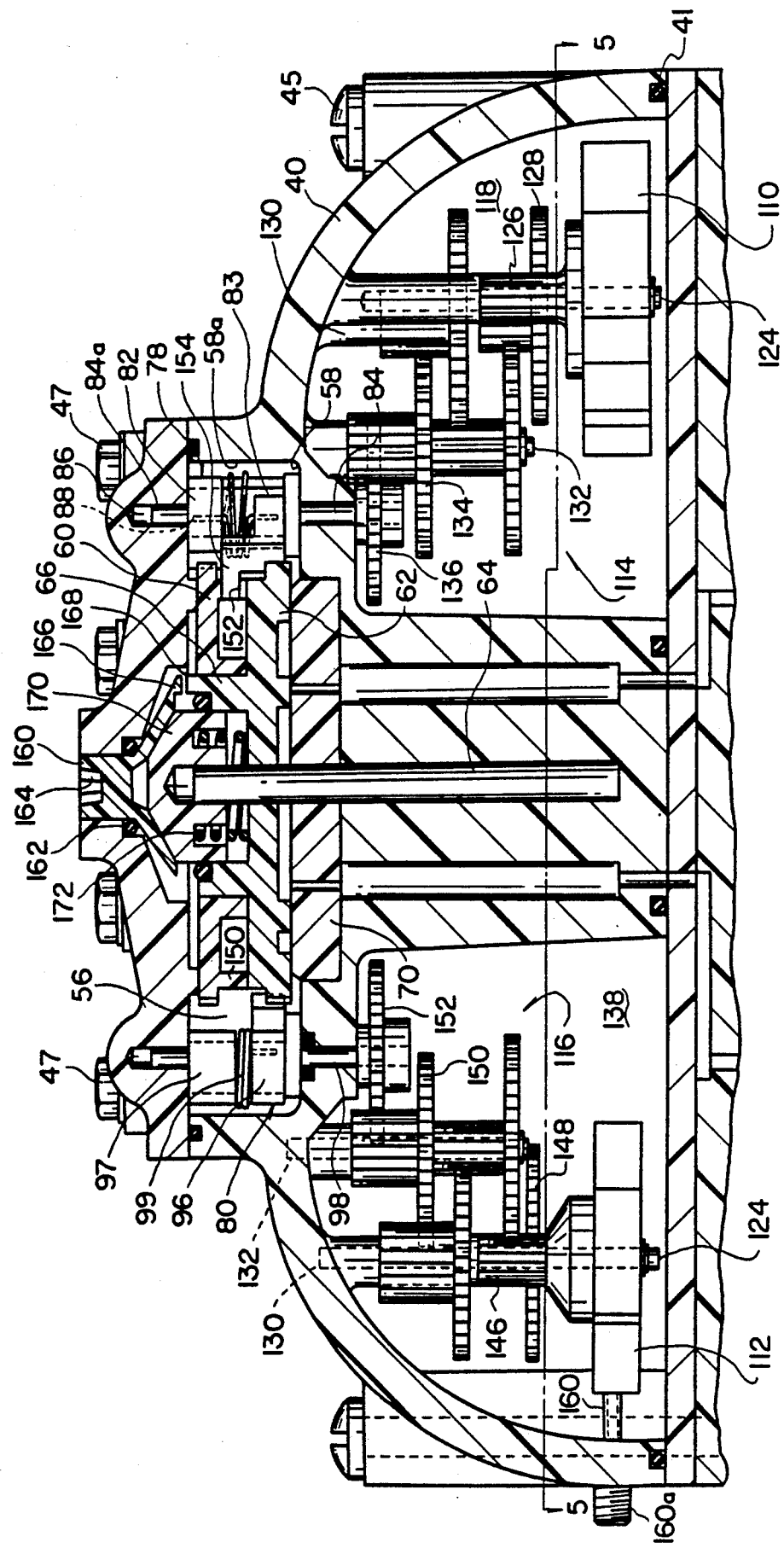
FIG. 3 is a cross-sectional view of the control valve as seen from the plane indicated by the line 3—3 in FIG. 2.
Figure 4:
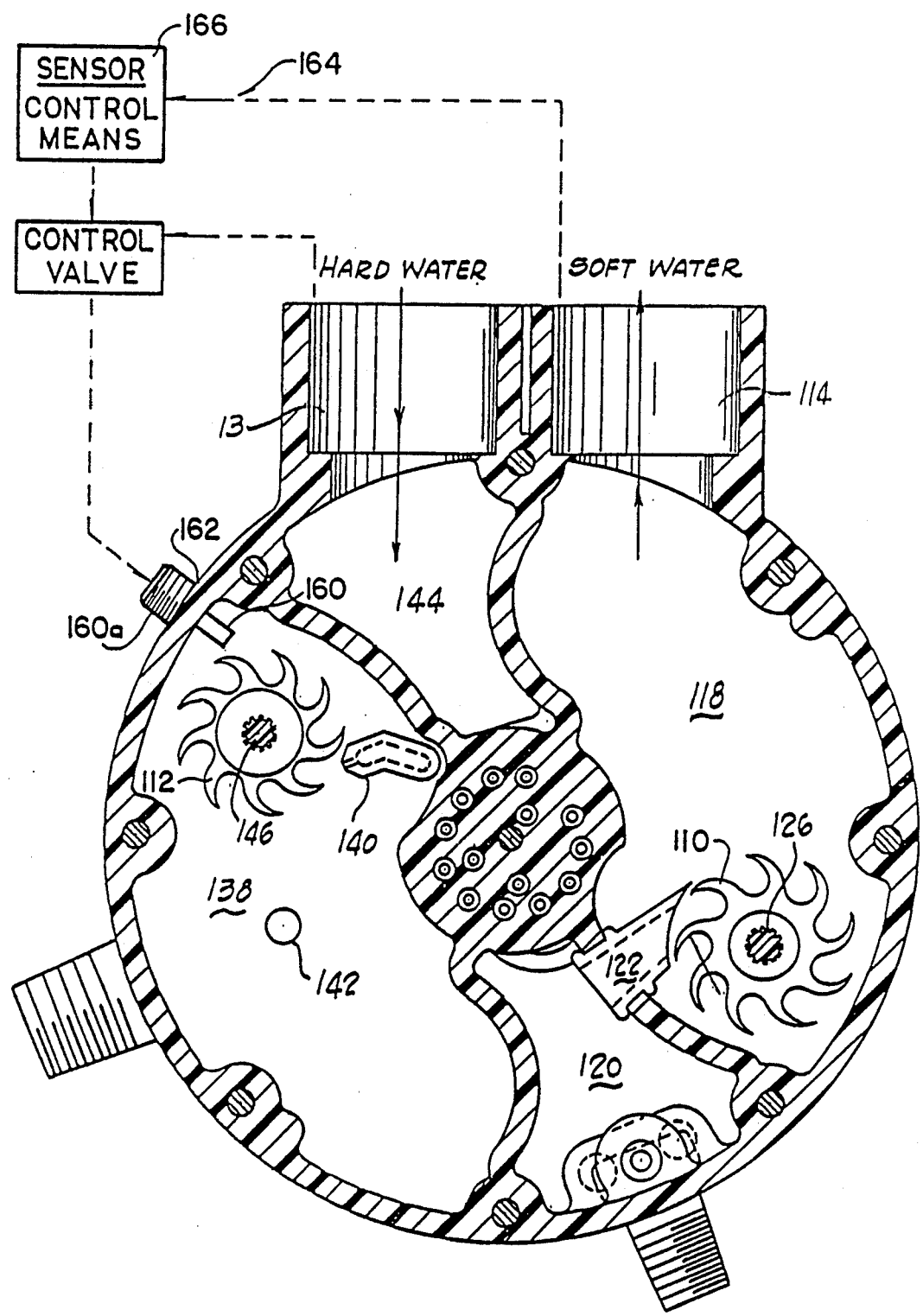
FIG. 4 is a cross-sectional view of the control valve as seen from the plane indicated by the line 4—4 in FIG. 3.
Figure 5:
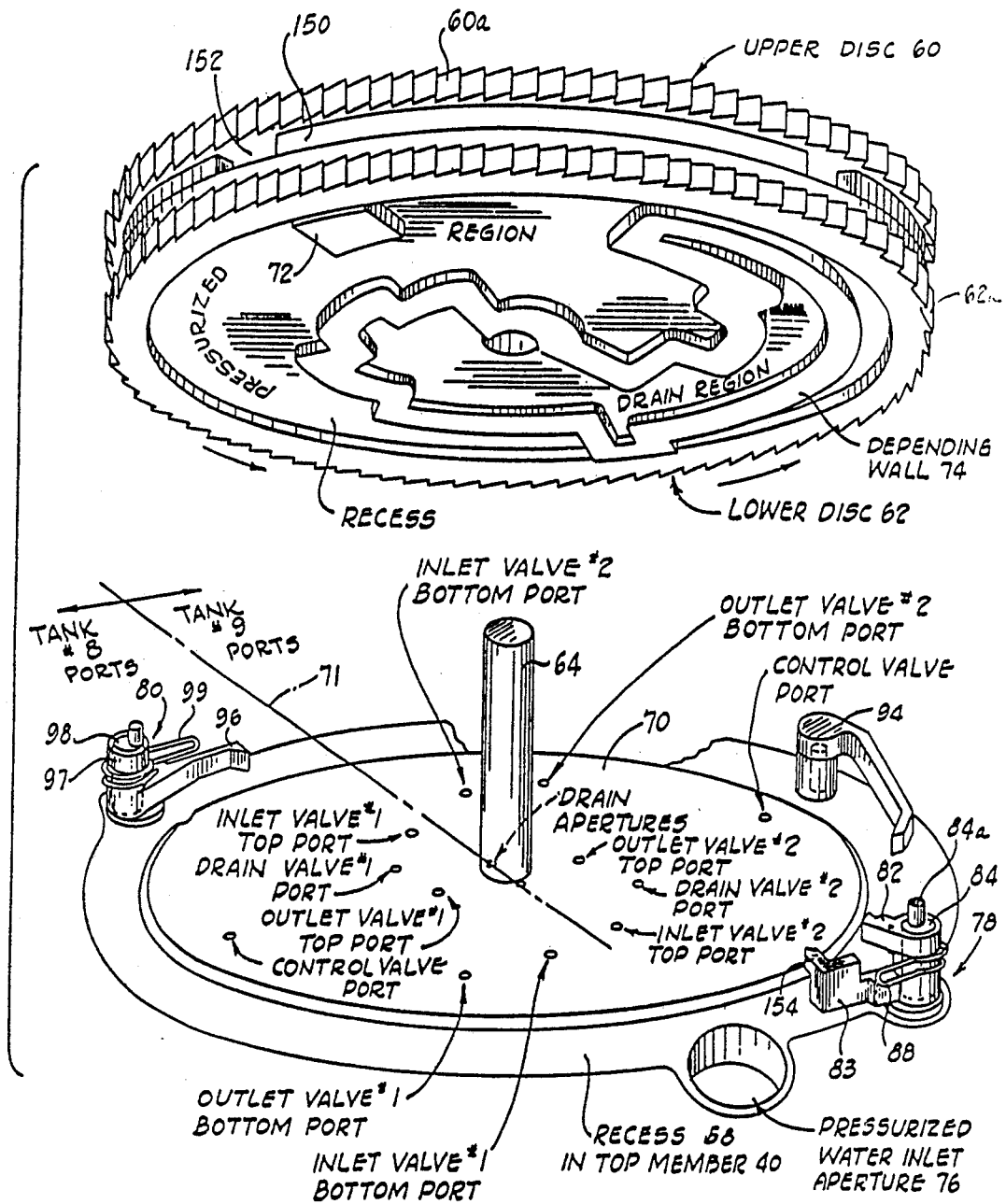
FIG. 5 is a schematic view depicting selected parts of the valve of FIG. 2 which form the servo control system.

Referring also to FIGS. 3, 4 and 5, the servo control mechanism is located in an enclosed chamber 56 defined by a recess 58 in the top member 40 and the cover assembly 46 which overlies the recess. The servo control mechanism includes a pair of concentrically positioned discs 60, 62, each disc having perimetrically disposed ratchet teeth 60a, 62a, respectively. An upwardly extending stub shaft 64 defines an axis of rotation for the discs. The lower disc 62 is journaled on the shaft 64 and includes a hub 66 (shown in FIGS. 3 and 5) which rotatably supports the upper disc 60.

The upper disc 60 was designated as a water usage monitor disc in the control valves disclosed in the above identified patents and its movement was a function of the amount of softened water discharged by the water control valve assembly 12 through the outlet 14. In the present invention, the water usage disc 60 may be retained if a regeneration frequency based on the quantity of fluid treated is desired in addition to "on demand" and/or fluid quality related regeneration provided by the present invention. The lower disc 62 is a regeneration control disc and its movement controls the regeneration sequence for an exhausted softener tank.

As explained in greater detail in U.S. Pat. No. 3,891,552, the regeneration control disc 62 rotates in confronting contact with a disc-like, non-rotatable insert 70, positioned in the bottom of the recess 58. The insert includes a plurality of ports which communicate with piston chambers that operate the servo valves through pilot pressure passages integrally formed in the various members of the control valve assembly 12. As seen in FIG. 5, two sets of ports are provided and are located symmetrically about an imaginary diametral line 71. The ports to the left of the line 71 control the regeneration of the tank 8, whereas the ports to the right of the line 71 control the regeneration sequence for the tank 9. It should be apparent, that during a regeneration cycle, the lower disc 62 rotates 180 degrees to effect a complete regeneration cycle of one of the tanks. It should be noted, that the location of the ports and their function, as shown in FIG. 3 correspond to the ports shown and described in U.S. Pat. No. 3,891,552. Alternate port positions and disk configurations are contemplated by the present invention.

Referring to FIG. 3, the regeneration control disc 62 includes a depending projection 72, and a depending wall 74 that divides the undersurface of the disc into a pressurized region and a drain region. Softened water at supply pressure is admitted into the chamber 56 through a water inlet aperture 76. Because the lower surfaces of the projection 72 and the depending wall 74 are slightly lower than the undersurface of the rim of the lower wheel, water can flow into and pressurize the pressurized region. The wall 74 sealingly engages the insert 70 and isolates the drain region from the pressurized region. The drain region is maintained at an ambient drain pressure by drain ports located near the stub shaft 64 which communicate with a drain conduit 16 through integrally formed flow passages in the control valve assembly 12.

In the preferred embodiment, the water usage and regeneration control discs 60, 62 are incrementally rotated by an indexing arrangement in the form of ratchet drives 78, 80. The ratchet drive 78 comprises a pair of pawls 82, 83 journaled and co-driven by an eccentric shaft 84. The upper end 84a of the shaft 84 is located by a bore 86 in the top cover assembly 46 (see FIG. 3). A spring 88 acting between a side wall 58a of the recess 58 urges the pawls 82, 83 towards the peripheral ratchet teeth 60a, 62a of the water usage and regeneration control discs 60, 62, respectively. A fixed, resiliently biased pawl 94 also engages the ratchet teeth of the upper disc 60 and prevents reverse rotation.

The ratchet drive 80 comprises a pawl 96 journaled an driven by an eccentric shaft 98 and urged toward engagement with the regeneration control disc 62 by a spring 99 acting between the side wall 58a and the pawl 96. A spacer bushing 97 maintains the pawl 96 in the lower most position on the shaft 98 as shown.

Referring to FIGS. 2, 3 and 5, the eccentric shafts 84, 98 which upon rotation produce the necessary reciprocating motion in the ratchet drives 78, 80 are coupled to regeneration initiating and regeneration control turbines 110, 112 by reduction gear trains, indicated generally by the reference characters 114, 116, respectively. The water usage turbine 110 (if used) and associated gear train are located in an outlet chamber 118 defined by the top member 40 and the upper disc member 41 that communicates with the outlet conduit 14. Softened water is delivered to the outlet chamber 118 from a softened water collection chamber 120 by way of a channel 122. The flow of softened water to the collection chamber 120 from the softener tanks 8, 9 is controlled by servo valves housed in the lower portions of the control valve assembly 12 and described fully in the above referenced patent. The channel 122 directs softened water from the collection chamber 120 to the turbine blades 110 and thus any softened water discharged through the control valve causes attendant rotation in the water usage turbine.

The water usage turbine 110 is rotatably supported by a downwardly extending shaft 124 and includes an integrally formed pinion gear 126 that drives a first reduction gear 128. A plurality of cascading reduction gears are journaled on spaced shafts 130, 132. A final reduction gear 134 mates with an input gear 136 fixed to the end of the eccentric shaft 84.

The regeneration control turbine 112 and associated gear train is located in an overflow chamber 138 defined by the top member 40 and the upper disc member 41. During a regeneration cycle, a controlled flow of softened water is discharged through a regeneration control nozzle 140 located in close proximity to the regeneration turbine 112 so that the discharged fluid impinges on the turbine blades to cause rotation in the turbine 112. The fluid leaving the turbine blades leaves the overflow chamber through a port 142 that communicates with the drain conduit 16.

The incoming hard water is delivered to an inlet chamber 144 through the inlet conduit 13. The inlet chamber 144 is defined in part by the top member 40. The communication of the incoming hard water to one or both of the tanks 8, 9 is controlled by inlet valves described and discussed in the above referenced patent.

The regeneration control turbine 112 includes an integrally formed pinion gear 146 that drives a first reduction gear 148. A similar cascading gear train is in turn driven by the first reduction gear 148. A final reduction gear 150 mates with an input gear 152 fixed to the end of the eccentric shaft 98 that journals the pawl 96. Thus, rotation of the regeneration turbine during a regeneration cycle is translated to reciprocating motion in the pawl 96 which in turn causes incremental movement in the regeneration control disc. 62.

A regeneration cycle is initiated whenever one of the control valve ports (shown in FIG. 5), located in the insert 70 is uncovered by the projection 72 and thus exposed to softened water in the pressurized region. The communication of pressurized softened water to the control valve ports opens a control valve which in turn connects a source of softened water to the regeneration drive nozzle 140. A regeneration cycle continues until the control valve port is again covered and isolated from the soft water pressure in the servo chamber 56, thus closing the control valve and terminating the flow from the nozzle 140.

Because the ratchet drive 96 is operative only when the nozzle 140 is discharging fluid, the regeneration control disc 62 must be moved initially by the ratchet drive 78 to begin the regeneration cycle. In the prior patents identified above, this initial movement was achieved by the lower pawl 83 in conjunction with the water usage disc 60. By way of summary and as seen in FIG. 5, the water usage disc 60 includes a discontinuous axially depending flange 150 located near the periphery of the disc, just below the ratchet teeth. The surface of the flange 150 is interrupted periodically by slots 152 which are preferably equally spaced around the circumference of the flange. The lower pawl 83 of the ratchet drive 78 includes a camming prong 154 which extends beyond the tip of the pawl. The prong 154 is located in the same plane as the slotted flange 150 of the water usage disc 60. When riding against the outer surface of the flange, the prong 154 displaces the pawl away from the ratchet teeth of the regeneration control disc 62. When the prong 154 drops into one of the slots 152 in the flange (shown in FIG. 5), it allows the pawl to engage the ratchet teeth of the regeneration control disc and thus rotation of the shaft 84 causes concurrent movement in the water usage and regeneration control discs 60, 62. The initial movement effected in the regeneration control disc by the ratchet drive 82 rotates the disc 62 sufficiently to cause the projection 72 to uncover one of the control ports, thus initiating a regenerating cycle. Once a control port is opened, the fluid discharged by the nozzle 140 will operate the ratchet drive 80 to continue movement in the regeneration control disc. The regeneration cycle is terminated when the control disc 62 rotates to a position where the control valve ports are again closed.

Because a regeneration cycle is initiated whenever the prong 154 becomes aligned with a slot 152 in the water usage disc 60, the frequency of regenerating in the prior valves was determined by the frequency or spacing of the slots in the flange 150. Generally, a water usage disc having an appropriate number of slots were selected at installation in accordance with the hardness of the water at the installation site. Although the frequency of regeneration can be modified or changed at any time by the replacement of the water usage disc 60, once replaced, the frequency of regeneration was fixed until the disc was again changed irrespective of the quality of fluid being delivered by the system.

According to the invention, regeneration of a resin tank can be initiated at any time, independent of the quantity of water treated as measured by the water usage disk 60 and associated water usage turbine 110. In fact with the present invention, the water usage monitoring function provided by the water usage turbine 110 can be eliminated. Referring in particular to FIG. 4, a regeneration initiation nozzle 160 is disposed in the overflow chamber 138 and is positioned such that a stream of fluid emitted by the nozzle 160 impinges on the regeneration control turbine 112 imparting rotation to it. The regeneration initiation nozzle 160 extends through a wall 162 of the control valve and includes a fitting 160a which is connectable to an external regeneration control, shown schematically in FIG. 4 and indicated generally by the reference character 164.

To initiate regeneration, the nozzle 160 emits the fluid stream to drive the turbine 112 for relatively short time interval. Once initiated, the regeneration control nozzle 140 continues to drive the regeneration control turbine 112 until the regeneration cycle is completed. As explained above, fluid is communicated to the nozzle 140 when the regeneration control disk 62 is rotated a sufficient distance so that the depending projection 72 (shown in FIG. 5) moves a sufficient distance to uncover one of the control ports. In short, the regeneration initiation nozzle 160 is only activated long enough to produce the necessary rotation in the regeneration control disk 62 to uncover one of the control ports.

The control system for controlling the communication of pressurized fluid to the nozzle 160 can take various forms. In FIG. 4, a sensor 166 monitors the quality of softened water exiting the water softener through the outlet conduit 14. Upon sensing a predetermined fall off in quality of softened water (or the presence of an excessive level of "hard ions", which normally is an indication that the resin bed is exhausted), a source of fluid pressure, preferably softened water, is communicated to the regeneration initiation nozzle 160 for predetermined amount of time in order to cause an incremental rotation in the regeneration control disk 62 i.e. a sufficient amount of rotation to cause the depending projection 72 to uncover one of the control ports. Once the regeneration cycle is initiated by this initial movement, the communication of pressurized fluid to the initiation nozzle 160 can be terminated because the necessary drive force for rotating the regeneration control turbine 112 is provided by the regeneration control nozzle 140.

Alternate control systems for the regeneration initiating nozzle 160 can be employed. The sensor 166 can also be replaced by a fixed timer which would periodically communicate pressurized fluid to the initiation nozzle 160. A manual initiation may also be provided which would allow the user to manually communicate pressurized fluid to the nozzle as by a push button valve or other operator actuated device. In these latter forms of control, the source of pressurized fluid for the regeneration initiation nozzle 160 may also be the softened water discharged by the outlet conduit 14.

As indicated above, the water usage turbine can be eliminated with the present invention if the user/operator wants to rely solely on the external control system 164 to initiate regeneration of an exhausted tank.

According to the invention, if the usage turbine 110 is eliminated, the channel 122 (shown in FIG. 4) can also be eliminated. As should be apparent, the channel acts as a restriction to the flow of water passing through the tank since all hard water entering the tank for treatment must pass through the channel 122. The elimination of this element enables a given tank to process water at a much higher flow rate.

Figure 6:
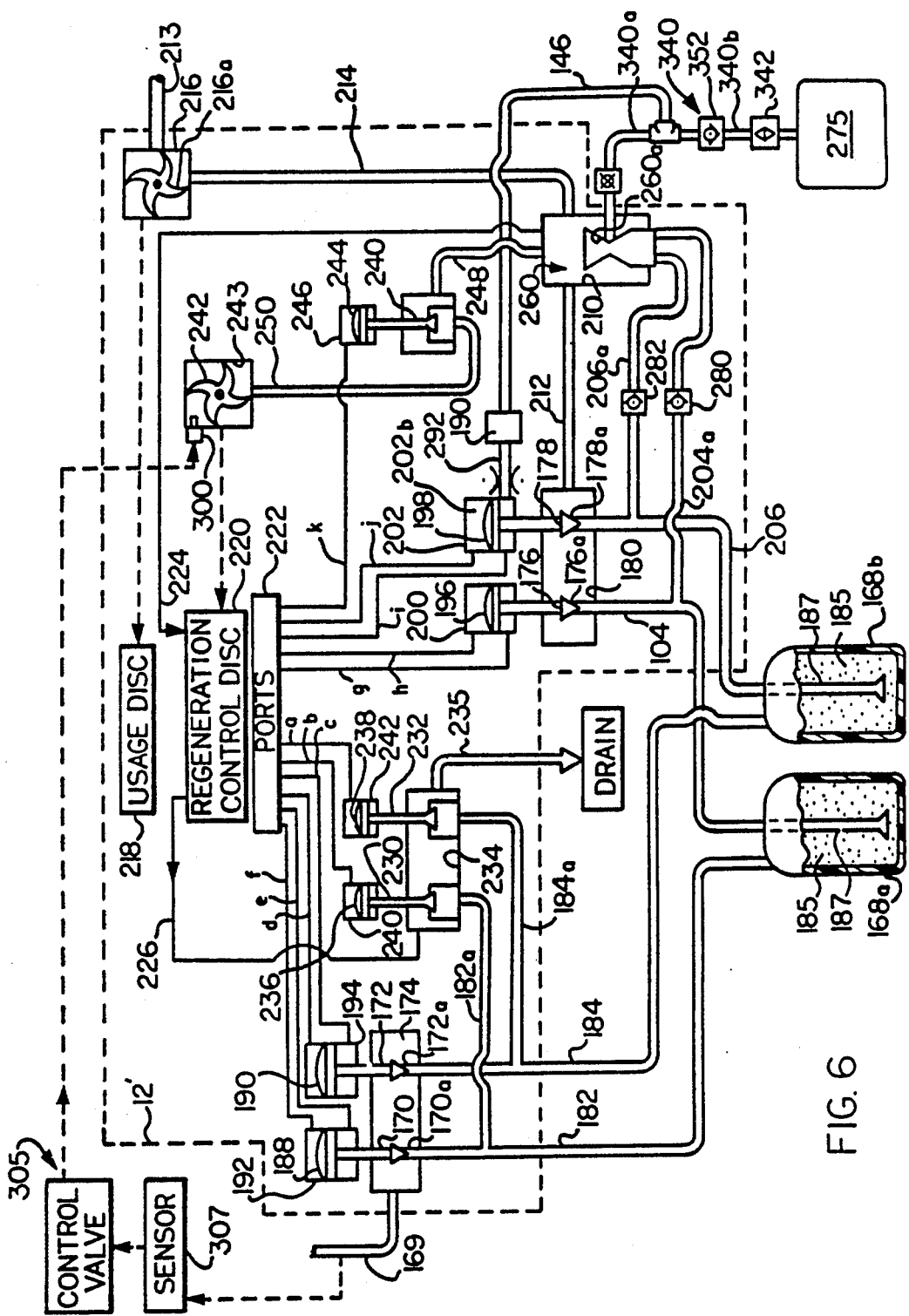
FIG. 6 is a diagrammatic representation of a portion of a deionization apparatus including a control valve embodying the present invention.

FIG. 6 schematically illustrates the construction of an anion section of a deionization apparatus disclosed and claimed in U.S. Pat. No. 4,427,549 which is owned by the assignee of the present application and which is hereby incorporated by reference. The control valve of the present invention is adaptable to a deionization system and, in particular may be used as the cation and/or the anion control valve assembly for the system. The components forming part of an anion control valve assembly constructed in accordance with the present invention are surrounded by the dash line, designated by the reference character 12'. The construction of the anion control valve assembly 12' is similar to the construction of the water softener control valve assembly 12 described above and shown in FIGS. 1–5.

The control valve assembly 12' controls the intercommunication between anion resin tanks 168a, 168b, the communication between these tanks and a transfer conduit 169, and the regeneration of an exhausted tank.

The valve assembly 12' includes a plurality of water pressure operated valves, the opening and closing of which are controlled by a fluid signal control system. Whether the tanks 168a, 168b are on-line or off-line is determined by a pair of inlet valves 170, 172 disposed in an inlet chamber 174 and a pair of outlet valves 176, 178 disposed in an outlet chamber 180. The transfer conduit 169 fluidly communicates with the inlet chamber 174. The inlet valves 170, 172 control the communication between the inlet chamber 174 and respective tank inlet passages 182, 184. Opening the valves 170, 172 allows decationized water in the transfer conduit 169 to proceed into the tanks 168a, 168b, respectively. In the illustrated tank construction, water to be treated enters the top of the tank, passes through ion exchange material 185 and then leaves the tank through a discharge riser 187 that opens near the bottom of the tank. It should be noted that reverse flow through the tank is also contemplated by the present invention.

The valves 170, 172 are operatively connected to pistons 188, 190 disposed in chambers 192, 194, respectively. The application of fluid pressures above the pistons apply valve closing forces to urge the valves 170, 172 into engagement with respective valve seats 170a, 172a. The application of fluid pressure to the underside of the pistons exert valve opening forces.

The outlet valves 176, 178 are similarly configured and include pistons 196, 198 disposed in chambers 200, 202. The application of fluid pressure above and below the pistons 196, 198 applies valve closing and opening forces, respectively for moving the valves 176, 178 towards and away from associated valve seats 176a, 178a.

The valves 176, 178 control the communication between tank outlet passages 204, 206 of the tanks 168a, 168b, respectively with the outlet chamber 180. The outlet passages 204, 206 are connected to the top of the discharge risers 187 of the tanks 168a, 168b, respectively. When either of the valves are open, water flow from the associated tank is allowed to proceed to a water collection chamber 210 by way of a passage 212. The collection chamber 210 communicates with an outlet conduit 213 through a fluid path that includes a passage 214 and an outlet chamber 216 that includes a rotatable turbine 216a. As described above, the turbine is mechanically coupled to a usage monitoring disc 218 which rotates as a function of the amount of water discharged through the outlet chamber 216 into the outlet conduit 213.

The monitoring disc 218 forms part of a water pressure operated control system that controls the generation of fluid signals and the sequence of application of the fluid signals to the piston chambers associated with the various valves.

The monitoring disc 218 cooperates with a regeneration control disc 220. The control disc rotates atop an annular insert 222 that defines a plurality of ports each communicating with an associated signal line. Signal lines a-k are illustrated in FIG. 6; each line extends from the port insert 222 to one of a plurality of piston chambers. The control disc 220 sealingly engages the top surface of the insert 222 and includes structural formations that operate to communicate the ports formed in the insert 222 with either water supply pressure (supplied by a passage 224) or ambient pressure (by communicating the ports with a drain passage 226). The ports and regeneration control disc 220 are arranged so that as the regeneration wheel rotates, the valves are sequentially operated in order to cycle an exhausted tank through a regeneration cycle.

In addition to the valve elements described above, the control valve assembly 12' also includes a pair of drain valves 230, 232 for controlling the communication of the tank inlet passages 182, 184, respectively, with a drain chamber 234 through respective branch passages 182a, 184a. The drain chamber 234 communicates with an ambient pressure drain through a drain conduit 235.

The drain valves 230, 232 are operated by pistons 236, 238 disposed in respective piston chambers 240, 242. In the preferred embodiment, the pistons are single acting and are driven to a valve open position by the application of fluid pressure to their top surfaces via signal lines a,b. The valves 230, 232 are arranged so that pressure in the branch lines 182a, 184a bias the valves towards their closed positions illustrated in FIG. 6.

A regeneration control valve 240 controls the communication of water pressure from the water collection chamber 210 to a regeneration control turbine 242. The valve 240 includes a single acting piston 244 disposed in a chamber 246. Like the drain valves 230, 232 the valve 240 is biased to its closed position by water pressure in the collection chamber 210 communicated through a passage 248. When the regeneration control valve 240 is opened (by the application of a fluid signal to the top surface of the piston by way of the signal line k) water pressure is allowed to proceed along the passage 248 to a passage 250 which includes a regeneration control nozzle (not shown in FIG. 6, but described above in connection with FIGS. 1-5) for directing water against the turbine 242. The turbine 242 is mechanically coupled to the regeneration control disc 220 so that rotation of the turbine effects rotation of the control disc.

The application of fluid signals to the various piston chambers, as controlled by the relative movement of the regeneration control wheel with respect to the port insert 222, determines the sequence of valve actuation. The control disc 220 selectively communicates either water pressure from the collection chamber, fed to the wheel by the pressure 224, or the ambient drain pressure via the passage 226, to the various signal lines.

The regeneration components include a regeneration fluid aspirator 260 disposed in the collection chamber 210. The aspirator comprises a fluid flow regulating element (not shown) and a venturi 260a. The outlet of the venturi communicates with the tank outlet passages 204, 206 through branch passages 204a, 206a, that include check valves 280, 282. The throat of the venturi communicates with the regeneration supply vessel 275 through the supply conduit portions 340a, 340b.

When either of the drain valves 230, 232 are opened, water in the collection chamber 210 is allowed to proceed through the venturi 260a and into the associated anion tank. For example, suppose the drain valve 230 is opened. Water from the collection chamber will flow through the venturi 260a into the outlet passage 204 of the tank 168a. The water will then travel through the tank 168a in a counterflow direction and be ultimately discharged to the ambient drain by way of the inlet passage 182, the branch passage 182a and the drain chamber 234. As water passes through the venturi, regeneration fluid is drawn from the vessel 275 and mixed or "aspirated" with the venturi fluid. The regeneration fluid (not diluted with deionized water) passes through the anion tank until the associated drain valve is closed. The effluent from the tank is discharged to drain via the drain chamber.

The overall operation of the anion section is as follows. Assume for purposes of explanation that the tank 168a is on-line and the tank 168b is regenerated and is off-line. Under these conditions, the inlet valve 170 and outlet valve 196 are open and water travels from the conduit 169, to the tank 168a via the passage 182, leaves the tank by way of the passage 204, travels through the passage 212, the collection chamber 210, the passage 214, finally being discharged into the outlet conduit 213 after traveling by the turbine 216a in the outlet chamber 216. After the usage disc 218 is rotated by the turbine 216a through a predetermined arc, corresponding to a predetermined amount of water discharged by the tank 168a, a regeneration cycle is initiated. As fully disclosed in U.S. Pat. Nos. 3,891,552 and 4,298,025, the monitoring disc 218 initiates regeneration by causing an initial rotation in the regeneration control disc 220 which uncovers a port communicating with the signal line k thus causing the application of water pressure to the chamber 246, effecting opening of the regeneration control valve 240. Once the valve 240 opens, a flow of water from the collection chamber 210 against the regeneration control turbine 242 is established, thus causing the continued rotation of the control disc 220.

As mentioned earlier, as the regeneration control disc rotates, ports defined by the insert 222, communicating with the signal lines a-k are communicated with either water pressure or drain pressure to either open or close the various valves. In the preferred regeneration cycle of the tank 168a, the inlet valve 172 and the outlet valve 178a are opened by pressurizing the signal lines c and i, thus placing the tank 168b in parallel service with the tank 168a. The inlet and outlet valves 170, 176 are then closed by pressurizing the signal lines f, h thus placing the tank 168a off-line.

Regeneration of the tank 168a commences by pressurizing the signal line b to open the drain valve 230 so that the inlet passage 182 of the tank 168a is communicated to the drain conduit 235 via the passage 182a and drain chamber 234. The opening of the drain valve 230 establishes a fluid path between the collection chamber 210, and the drain. Deionized water in the collection chamber travels through the venturi 260a and into the outlet passage 204 by way of the branch passage 204a and check valve 280. As the deionized water passes through the venturi 260a, regeneration fluid from the vessel 275 is drawn into and mixed (or aspirated) with the water. The regeneration fluid mixture travels through the tank 168a in a counterflow direction, that is from the outlet passage 204 to the inlet passage 182 and is eventually discharged to the drain.

After a predetermined rotational movement in the regeneration control disc 220, a flushing step commences. As disclosed earlier, the lower portion 202a of the piston chamber 202 communicates with a flush chamber 290 through a restricted passage 292. Whenever the signal line i is pressurized, a fluid flow path between the lower chamber 202a and the regeneration supply conduit portion 340a is established. When the regeneration of the tank 168a is first initiated, the signal line j is depressurized and the signal line i is pressurized to ensure opening of the outlet valve 178. After a relatively short interval of time, the signal line i is depressurized. The valve 178, however, remains open.

When the control valve 240 is open, a fluid stream is directed to the regeneration turbine 242 located in a turbine chamber 243. The turbine 242 is mechanically coupled to a regeneration drive pawl (such as the drive pawl 96, shown in FIG. 5) through a reduction gear train (such as the gear train 116, shown in FIG. 4). The pawl is journaled in on eccentric shaft (such as shaft 96 in FIG. 5). Rotation of the turbine 242 thus effects incremental rotation of the regeneration control disc 220 and in so doing, effects a regeneration cycle. The regeneration cycle continues until the control port communicating with the control valve chamber 246 is depressurized thus closing the control valve 240. During regeneration, a regeneration control nozzle (not shown, but similar to the control nozzle 140 shown in FIG. 3) directs a stream of water against the turbine 242.

As in the embodiment of the invention illustrated FIGS. 1-5, in the FIG. 6 embodiment, a regeneration of a resin tank can be initiated at any time, independent of the amount of fluid treated by a tank. In particular, a regeneration initiation nozzle 300 is disposed in the regeneration turbine chamber 243. By communicating pressurized fluid to the nozzle 300, a stream of fluid imparts rotation to the turbine 242. As described above, rotation of the turbine 242 effects rotation in the regeneration control disk 220. As in the first described embodiment, pressurized fluid need be communicated to the regeneration initiation nozzle 300 for only a small interval of time. The regeneration control disk 220 only needs to be rotated a distance sufficient to uncover one of the control ports in the insert 220 in order to commence regeneration. Once the regeneration cycle is started, pressurized fluid is communicated to a regeneration control nozzle (not shown), similar to the nozzle 140 (shown in FIG. 3) which continues the rotation of the regeneration control turbine 242 until the regeneration cycle is completed.

The communication of pressurized fluid to the regeneration initiation nozzle 300 is controlled by a control system indicated generally by the reference character 305. The control system may take various forms and in the embodiment illustrated in FIG. 6, a sensor 307 monitoring the quality of treated water leaving the outlet conduit 213 (or alternately monitoring characteristics of the incoming fluid in the conduit 169) controls a valve that in turn controls the communication pressurized fluid to the nozzle 300. When the quality level of the deionized water leaving the outlet 213 falls below a predetermined level, the sensor activates the control valve in order to initiate regeneration. The source of pressurized fluid for the nozzle 300 may be the fluid to be treated in the conduit 169, the treated fluid in the conduit 213 or a fluid external to the system, since the fluid emitted by the nozzle 300 is discharged to the drain.

As described in connection with the embodiment of FIGS. 1-5, the control system may also comprise an external timer arrangement for periodically initiating regeneration based on the passage of time. A manual regeneration feature may also provided.

As indicated above the sensor 307 can monitor the incoming fluid (in the conduit 169) and initiate regeneration as a function of changes in characteristics (i.e. mineral content) of the incoming fluid or influent. In addition the control system 305 can monitor both the quantity of fluid treated by the system and the average conductivity (or other ion related characteristic) of the incoming fluid to arrive at the approximate number of "grains" processed by a given tank since its last regeneration. When the total grains removed reaches a predetermined number, related to the total number of ion sites available in the ion exchange resin 185, the control system 305 would initiate regeneration by activating the regeneration initiating nozzle 300. The same type of control scheme can be applied to the embodiment illustrated in FIGS. 1-5.

Figure 7:
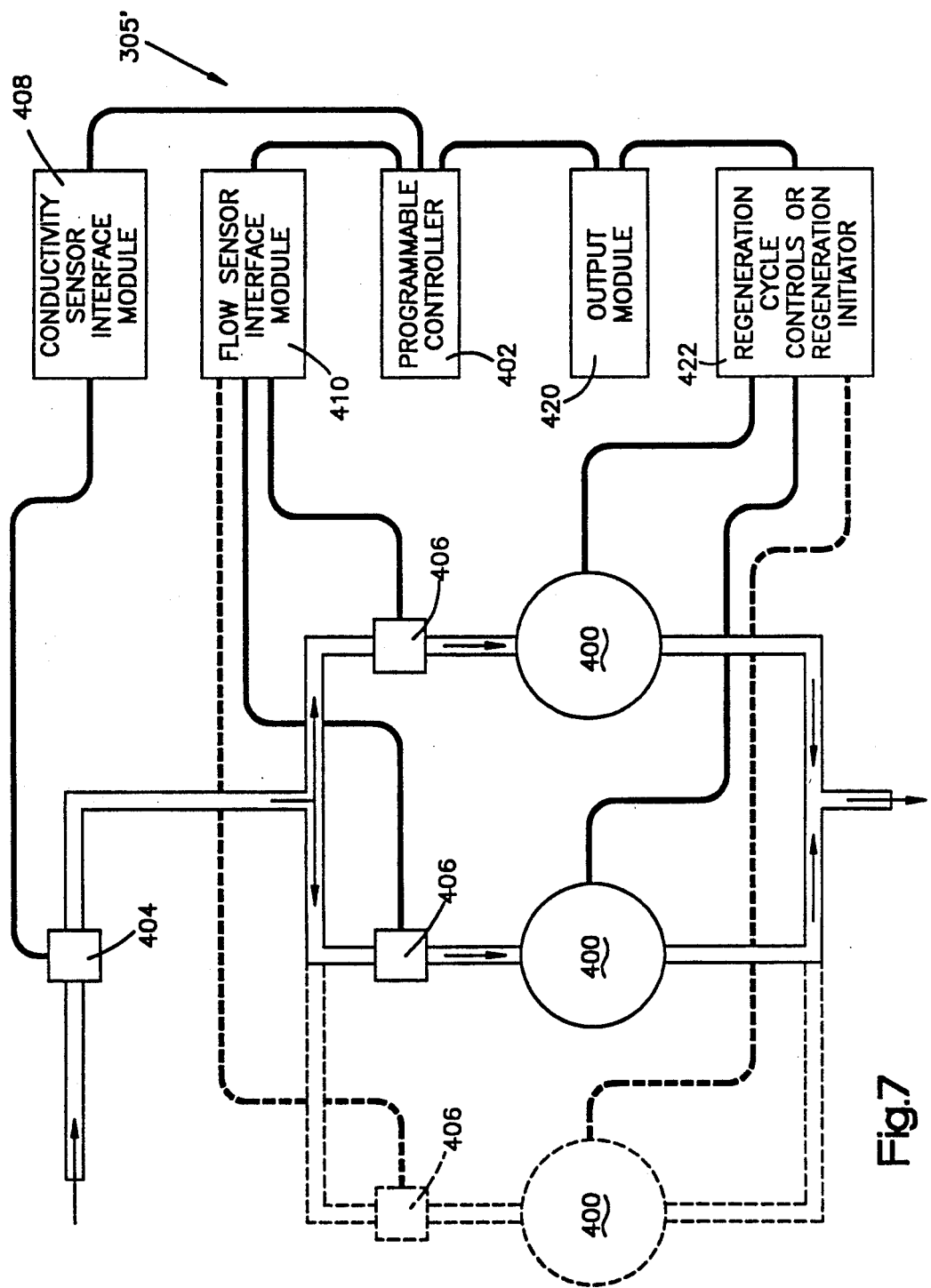
FIG. 7 is a diagrammatic representation of a regeneration control system for a fluid treatment device, constructed in accordance with a preferred embodiment of the invention.
Figure 8:
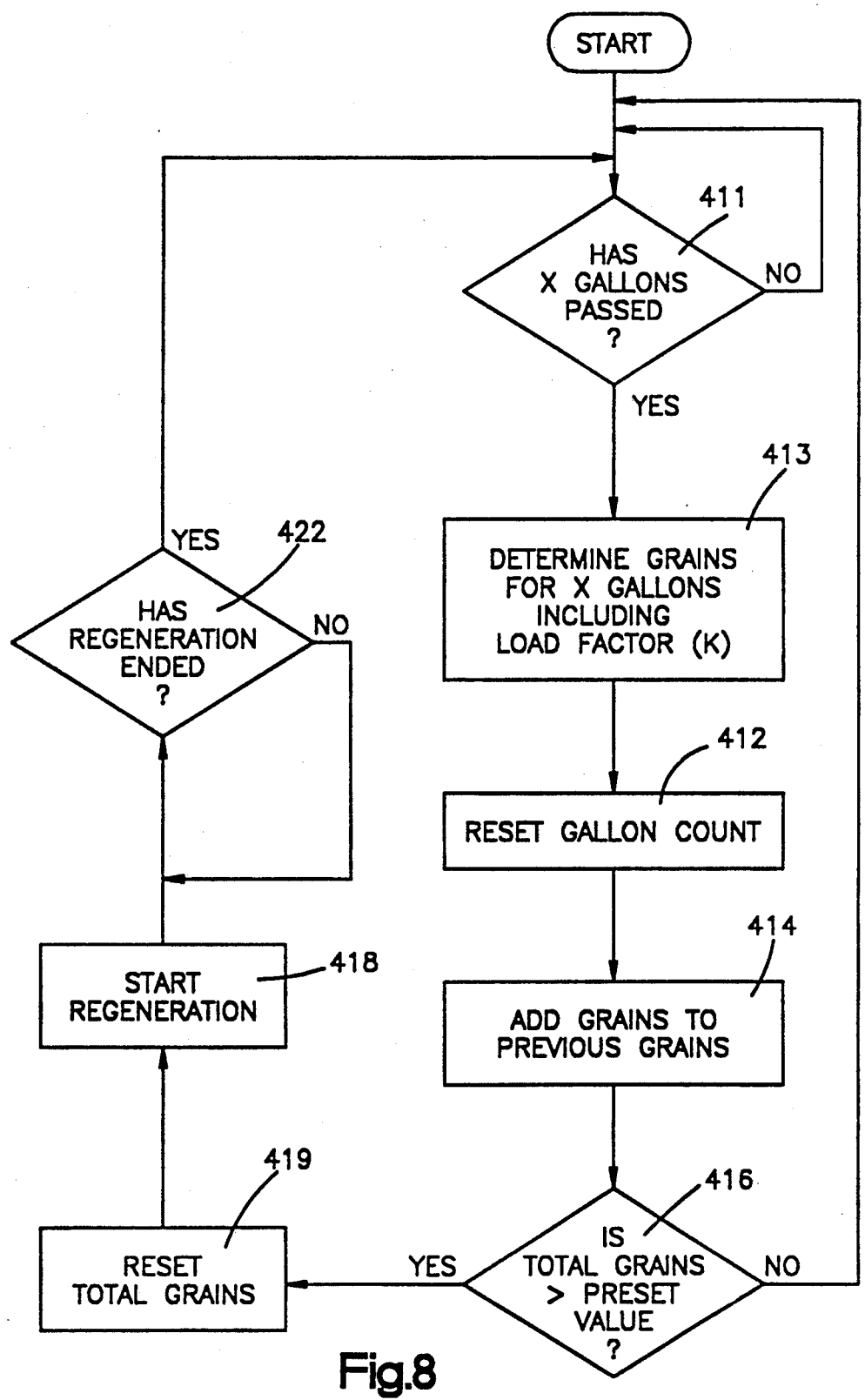
FIG. 8 is a flow chart depicting a portion of the method steps performed by the control system shown in FIG. 7; and, FIG. 9 is a diagrammatic representation of a programmable controller and associated hardware forming part of the regeneration control system shown in FIG. 7.

FIGS. 7-9, illustrate a regeneration control system 305', embodying the present invention, which is operative to control the regeneration of a fluid treatment system such as a deionization system, as a function of the "total grains" conveyed to the ion exchange bed by the influent. The disclosed regeneration control system provides a "feed-forward" control in that the system determines when an ion exchange bed requires regeneration based on information obtained from the input (influent) rather than from the output (effluent) which would be considered a feedback type of system.

The disclosed control system 305' can be used to activate the regeneration initiating nozzle 30 in the apparatus shown in FIGS. 1-5. In addition, it can be used to determine the frequency of a regeneration for a fluid treatment system in general that may use other forms of regeneration control mechanisms and hardware.

To facilitate the description, the disclosed control system will be described in connection with a deionization system such as that shown and described in U.S. Pat. No. 4,427,549.

Referring in particular to FIG. 7, the control system 305' is shown as forming part of a large scale deionization system that includes multiple ion exchanger assemblies, indicated schematically by the reference character 400. Each ion exchanger assembly 400 comprises anion and cation ion exchange beds (not shown) which may be contained in a single housing or alternately and preferably, located in interconnected, but separate tanks or housings. The ion exchange tank assemblies themselves do not form part of the invention.

It should be understood, that the multiple tank assemblies 400 shown, connected in parallel, increase the capacity of a given deionization system. The capacity of a system is determined by the size of the ion exchange bed and/or the number of beds connected in parallel.

According to this embodiment of the invention, a programmable controller 402 is interconnected with a conductivity sensor 404 and one or more flow sensors 406. In the illustrated embodiment, the conductivity sensor 406 is interconnected with the programmable controller via a sensor interface module 408. Similarly, the flow sensors 406 are interconnected with the controller 402 through an associated flow sensor interface module 410. The sensor interface modules 408, 410 receive signals from the associated sensors and process these signals to produce a signal compatible with and recognizable by the programmable controller.

Referring also to FIG. 8, the programmable controller executes control steps which may be in the form of a program or a sequence of instructions stored in the programmable controller. The programmable controller 402 operating under the control of the stored program, uses the information provided by the conductivity sensor 404 and the flow sensors 406 to monitor the "total grains" communicated by the influent water to the treatment system. As is known, an ion exchange resin includes a predetermined number of ion exchange sites each capable of holding a grain or ion. The information regarding the "total grains" processed by the system, is used to determine when a predetermined level of exhaustion in the ion exchange resin has been reached so that regeneration can be initiated before the bed reaches full exhaustion and before ion "break through" occurs.

It has been found that the "total grains" processed by a deionization system is given by the equation:

$$\text{Total Grains} = \int_0^t k(TDS)(\text{flow})dt$$

Where k is a loading factor that is a function of the TDS (total dissolved solids) level of the influent water. It has been found, that the actual capacity of a given ion exchange bed is not a fixed or absolute number of grains. The capacity of a given exchange bed is reduced if the influent water has a high TDS level as compared to an influent having a low TDS level. For a deionization system resin, it has been found that if the TDS level of the influent is less than or equal to 200 parts-per-million (ppm) then k=1.0.

For a TDS level greater than 200 ppm, the loading factor (k) is determined by the following equation:

$$k = 1/[1.00 - 0.0005(TDS-200)] \qquad \text{eq. 2}$$

This compensating or loading factor slightly increases the calculated "total grains" for a given conductivity level to compensate for the reduced capacity of the exchange bed as the TDS concentration increases.

Referring again to FIG. 7, the flow sensor 406 continuously monitors the flow of influent water and this data is passed to the programmable controller 402 either continuously or intermittently. In the illustrated embodiment, the program executing within the controller 402 monitors the flow sensor 406 and at predetermined flow intervals i.e. "X" gallons, reads or receives the conductivity data from the conductivity sensor 404 as processed by the interface module 408. This step is represented by the block 411 in FIG. 8.

The conductivity number (which is normally expressed in micromhos) can be used to determine the loading factor (k) based on equation 2 set out above. The flow or volume information is reset to 0 after each sampling interval (X gallons) as indicated by the block 412. The programmable controller 402 determines the number of grains that have been communicated to the ion exchange bed since the last sampling (step 413 in FIG. 8) and adds this grains number (or a quantity representative of the grains) to an accumulating "total grains" number (shown by block 414) that is maintained by the controller 402. For example, if the sampling interval is ten gallons, the number of grains processed is equal to the load factor (k) multiplied by the TDS number that is derived from the conductivity information, multiplied by the volume of influent processed (in this example, ten gallons).

Because direct integration is not possible with an inexpensive programmable controller, in actual practice an approximation may be used to totalize the number of grains processed by the system. In the preferred and illustrated embodiment, the measured conductivity is compared to conductivity ranges stored in the programmable controller 402. The conductivity measured by the conductivity sensor interface module 408 then outputs a signal to the controller 402 that is indicative of the range of conductivity measured. The controller 402 uses this conductivity information to arrive at a quantity that is related to the "total grains" or total TDS processed since the last sampling.

Referring to FIG. 9, if the conductivity of the influent waters varies between 0 and 2000 micromhos (MMHOS), this total variation in conductivity may be divided into a plurality of discrete ranges, each range being 200–300 MMHOS wide. If for example, the conductivity of the influent water is measured to be in the range of 0–200 MMHOS, the controller 402 generates a number that is representative of the "total grains" processed by the bed since the last check. Preferably, this number includes the compensation or load factor k. The controller then subtracts this calculated interim "total grains" from a stored preset value, the preset value being a function of the capacity of the ion exchange bed and initiates regeneration of the bed if the result of the comparison is less than or equal to 0.

Alternately, the accumulated "total grains" is simply compared to a "preset value", stored in the controller 402 (see block 416 in FIG. 8), and regeneration is initiated by the controller (see block 418) if the accumulated "total grains" exceeds the preset value. When regeneration is initiated, the "total grains" is reset to zero (0) (block 419).

As seen in FIG. 7, a signal to effect regeneration is sent to an output module 420 which in turn communicates signals to a regeneration controller 422 which then regenerates the ion exchange tank or tanks. When the disclosed control scheme is used in connection with the control valve shown in FIGS. 1–5, the output module would in effect activate the nozzle 30 to commence regeneration as described above.

It has been found that a control system 305' using the following components provides satisfactory performance. The flow sensor 406 may comprise a Signet model 8500 flow transmitter manufactured by Signet Industrial of El Monte, Calif. This transmitter is capable of generating an electrical signal that is proportional to the flow rate of the influent water. This flow signal is then fed to an interface module such as a Signet Model MK9520 also manufactured by Signet of California. This device processes the signals received from the flow transmitter and generates a signal that's compatible and recognizable by to the programmable controller 402 which may comprise a model PC-00085 programmable controller available from Gould Inc. of North Andover, Mass. The conductivity sensor may comprise a Signet model MK8800 conductivity transmitter which continuously monitors the conductivity of the influent water and transmits a signal proportional to the conductivity to an interface device such as a Gould model AC-1120-000 interface module. This device processes the signal received from the conductivity sensor and includes a plurality of set points or conductivity ranges which are adjustable. The device is capable of sending a signal to the programmable controller 402 that is indicative of the conductivity range that is currently being measured by the conductivity sensor. This conductivity range signal is transmitted to and processed by the programmable controller. As explained above, the controller 402 under the control of a suitable program (a portion of which is represented by the flow diagram shown in FIG. 8) maintains a running total of the "total grains" processed by the ion exchange bed and initiates regeneration of the bed when the "total grains" is greater than or equal to a preset value (which is a function of the capacity of the ion exchange bed) is reached or exceeded.

As indicated above, the preset value is selected to be a number that is less than the maximum number of grains that can be processed by the ion exchange bed. As a result, the bed is not run to complete exhaustion but is regenerated prior to total exhaustion and "virgin" resin is maintained at the foot of the tank. The tank is then preferably regenerated using a counter-flow regeneration sequence using the control device described and illustrated in FIGS. 1–5 or alternately using automatic valves and timers located external to the ion exchange tank. Following regeneration, the controller performs an internal reset in order to restart the totalizing function.

The above identified programmable controller 402 is considered a simple device as compared to a full-function computer and in general comprises a plurality of counters which are incremented in response to signals received from external devices such as the flow and conductivity sensors and associated interface modules. In order to implement the totalizing function over a wide range of conductivity, a cascading counter technique is utilized which includes the use of intermediate counters. The intermediate counters accumulate a predetermined number of counts before outputting a count to an actual totalizer counter.

FIG. 9 illustrates schematically, the implementation of a cascading counter technique for totalizing the number of grains processed by a deionization system. As seen in FIG. 9, the conductivity sensor interface module 408 outputs signals that are indicative of a range of conductivity that is being measured by the conductivity sensor 404. In the illustrated embodiment, the total conductivity range of the influent water is 0–2000 MMHOS. The total range is divided into a plurality of ranges (only some of which are shown). The lower ranges are 200 MMHOS wide whereas the upper ranges are 300 MMHOS wide. The actual number of individual ranges and their extent are adjustable and are determined in part by the conductivity range expected in the influent.

The conductivity sensor interface module 408 is operative to close switches or relay contacts $CS_1$-$CS_n$ associated with the individual conductivity ranges. For example, if the conductivity sensor 404 is measuring a conductivity that is in the range of 0–200 MMHOS the switch CS1 is closed.

As described above, the flow sensor interface module 410 generates an output periodically or at predetermined volume intervals. For example, if the volume interval is ten gallons, at each ten gallon increment, the switches $FS_1$-$FS_n$ will close momentarily. If the conductivity being measured at that volume interval is in the range of 0–200 MMHOS, the switch CS1 L1 will also be closed and an intermediate counter $C_1$ will be incremented. As should be apparent, whenever the switches $FS_1$-$FS_n$ are closed, one of the intermediate counters ($C_1$-$C_n$) associated with the current conductivity measurement will be incremented.

Each intermediate counter $C_1$-$C_n$, however, must accumulate a preset number of counts before generating an output count to a totalizer counter. For example, the counter $C_1$ associated with the 0–200 MMHOS range must accumulate 20 counts before a count is sent to the totalizer counter. After a count is sent to the totalizer counter by an intermediate counter, the intermediate counter ($C_1$-$C_n$) is reset to zero to begin accumulating intermediate counts.

The preset count selected for each counter $C_1$-$C_n$ is a function of the TDS level in the influent water having a conductivity within the range associated with a particular counter and preferably is also a function of the load factor for a given TDS level being measured. With this technique, the need for a separate calculation of the load factor to be applied to the "total grains" calculation is eliminated.

It should be apparent that when the influent water is in the range of 1701–2000 MMHOS, each actuation of the flow sensor switches $FS_1$-$FS_n$ will generate a count to the totalizer counter whereas influent in the range of 0–200 MMHOS will require 20 flow sensor switch activations before the totalizer counter is incremented. As a result, influent water having a conductivity range of 1701–2000 MMHOS will cause regeneration of the resin bed at a substantially higher frequency.

It should be noted that in the illustrated schematic, only one set of intermediate counters are shown for all the ranges. For some applications, secondary counters which would receive counts from one or more intermediate counters may be used as well. In an application, requiring these secondary counters, the totalizer counter would not be incremented until a given secondary counter is incremented through a preset value.

The use of secondary counters improves the accuracy of the control system in applications where the conductivity of the influent water changes and in applications where a given counter has to reach a rather high preset number of counts before outputting a count to the totalizer counter. For example, suppose a first conductivity range in a particular application would require 100 counts on an associated counter before outputting a single count to the totalizer counter. If the conductivity range changed to a second conductivity range when the first counter had reached 98 counts, the 98 counts would never be added to the totalizer counter even though the counter was almost fully incremented. By using a secondary counter and connecting several intermediate counters to the secondary counter, the preset for the first counter could be substantially reduced. When the first counter was fully incremented to the lower preset value, a count would issue to the secondary counter. If the conductivity range changed, to the next level, the output of the second counter would also go to the same secondary counter. As a result, less accumulated counts would be lost when the conductivity of the influent changed since the count presets would be less for a given counter. In short, the "resolution" of the control system would be improved with secondary counters when used in certain applications.

The "total grains" count accumulated by the totalizer counter 450 is compared (whenever it is incremented) to a stored value (block 448 in FIG. 9) and if the count is equal to or exceeds the stored value the controller 402 initiates regeneration as indicated by the block 452 and activates the regeneration controls 422 associated with the ion exchange bed. As indicated above, the regeneration control hardware may be the control valve illustrated in FIGS. 1–5 or alternately may include external timers and valving which are adapted to perform the regeneration sequence once it is initiated.

The stored value to which the totalizer counter is periodically compared may be established and set during the installation of the system and in general is a function of the capacity of the ion exchange bed or beds. In a case of an deionization system, to simplify the control, the stored value may be related to the bed (either cation or anion) having the smaller capacity. To simplify the system, upon reaching the stored value, both anion and cation exchange beds would be regenerated. The regeneration may occur sequentially or concurrently depending on the system. In more sophisticated adaptations of the disclosed control, the conductivity and flow information may be used to determine a frequency of regeneration for the cation and anion ion exchange beds separately.

The present invention when applied to a deionization system such as that disclosed in U.S. Pat. No. 4,427,549, the water usage turbine 216a and the associated restriction to flow presented by the usage chamber 216 can also be eliminated. By eliminating the restriction, the flow rate of fluid through the system can be substantially increased for a given size resin tank.

Although the invention has been described with a certain degree of particularly, it should be understood that those skilled in the art can make various changes to it without departing from the spirit or the scope of the invention as hereinafter claimed.

We claim:

1. In a water softener control device including a housing enclosing a regeneration control means, the improvement comprising:
    a) a regeneration control disk for controlling the sequence of water softener regeneration;
    b) a regeneration control turbine disposed in a path of metered fluid flow;
    c) structure for causing fluid flowing along said path to impinge on said control turbine to effect turbine rotation during a regeneration cycle;
    d) drive means interposed between said turbine and said disk for rotating said regeneration control disk in response to turbine rotation, to effect a regeneration cycle of a resin tank forming part of a water softener system;

e) regeneration initiation nozzle means operative to emit a fluid stream against said turbine to effect rotation of said turbine for a predetermined amount of time in order to initiate the regeneration cycle, said nozzle means located external to said structure for causing fluid to impinge; and, f) control means for controlling the activation of said initiation nozzle.

2. The improvement of claim 1 further comprising:

a) a water usage turbine rotatably mounted within the control device in a path of discharged softened water for monitoring a flow of softened water from said control device; and, b) a water usage disk operatively coupled to said water usage turbine and supported within said housing for rotational movement in proportion to the amount of water discharged from the control device.

3. The apparatus of claim 1 wherein said control means comprises a sensor for monitoring the quality level of fluid discharged by said water softener control device, said sensor operatively connected to a fluid control means for communicating pressurized fluid to said regenerated initiation nozzle upon sensing a predetermined quality level in said fluid discharge by said device.

4. The apparatus of claim 1 wherein said control means comprises a sensor for monitoring source fluid to be treated by a water softener system, said sensor operatively connected to a fluid control means for communicating pressurized fluid to said regeneration initiation nozzle upon sensing a predetermined characteristic in said source fluid.

5. A control valve assembly for controlling a water softener system, comprising:

a) a regeneration control means including a sequencing means for sequencing a resin tank forming part of said water softener system through a regeneration cycle;

b) a turbine disposed in a turbine chamber operative to drive said sequencing means;

c) a turbine drive means including structure for emitting a stream of fluid at said turbine to effect rotation of said turbine, said structure operative to emit said stream after a regeneration cycle has been initiated by means external to said structure and being further operative to emit said stream during at least a substantial portion of said regeneration cycle;

d) a regeneration initiating nozzle disposed in said chamber for causing initial rotation in said turbine to initiate a regeneration cycle; and e) control means for controlling the communication of pressurized fluid to said regeneration initiating nozzle.

6. The apparatus of claim 5 wherein said control means includes a sensor for sensing the quality level of a source of fluid to be processed by the water softener, said control means operative to communicate pressurized fluid to said regeneration initiating nozzle upon sensing a predetermined quality level in said fluid to be processed.

7. The apparatus of claim 5 wherein said control means comprises a sensor for monitoring the quality level of fluid discharged by said water softener system, said sensor being operative to communicate pressurized fluid, for a predetermined time, to said regeneration initiating nozzle, upon sensing a predetermined quality level in said discharged fluid.

8. In a fluid treatment apparatus including a tank containing an ion exchange resin, a method for initiating and driving a regeneration sequence controller, comprising the steps of:

a) providing a regeneration sequence control means in a control valve housing;

b) providing a turbine in said housing operatively connected to said regeneration sequence means;

c) providing structure for impinging a metered flow of fluid against said turbine during a regeneration cycle in order to move said regeneration control sequencer through a predetermined range of movement;

d) providing a regeneration initiating nozzle in a fluid impinging relationship with said turbine, said nozzle located external to said structure for impinging; and e) communicating pressurized fluid to said regeneration initiating nozzle upon sensing a predetermined quality level in fluid entering said fluid treatment system or fluid discharged by said fluid treatment apparatus.

9. In a fluid treatment apparatus including at least one tank containing an ion exchange material for treating a source fluid, a regeneration control apparatus, comprising:

a) a control valve assembly including means for controlling a regeneration cycle for said ion exchange material;

b) said means having a servo valve system forming part of said control valve assembly, including;

i) a regeneration cycle sequencer for controlling the application of fluid pressure to valve means forming part of said control valve assembly;

ii) a turbine coupled to said sequencer for driving said sequencer through a regeneration cycle after regeneration has been initiated;

iii) a regeneration initiating fluid nozzle operative to direct a fluid stream at said turbine to impart rotation to said turbine to initiate a regeneration cycle;

iv) control means operative to control the communication of pressurized fluid to said regeneration initiating nozzle when a regeneration cycle is to be initiated;

v) a second nozzle located in an impinging relationship with said turbine and operative to emit a fluid stream in order to drive said turbine; and vi) second nozzle control means operative to communicate pressurized fluid to said second nozzle after an initial predetermined movement in said sequencer is imparted by said regeneration initiating nozzle.

10. The apparatus of claim 9 wherein said pressurized fluid for said regeneration initiating nozzle is said source fluid to be treated.

11. The apparatus of claim 9 wherein said pressurized fluid for said regeneration initiating nozzle is an output fluid of said treating apparatus.

12. The apparatus of claim 9 wherein said control means for said regeneration initiating nozzle monitors ion related fluid characteristics in said source fluid and initiates regeneration upon sensing a predetermined level of said characteristics in said source fluid.

13. The apparatus of claim 9 wherein said control means for said regeneration initiating nozzle monitors ion related characteristics of an output fluid treated by said ion exchange material and effects regeneration of said ion exchange material upon sensing a predetermined level of said characteristics in said output fluid.

14. The apparatus of claim 9 wherein said control means for said regeneration initiating nozzle monitors the quantity of fluid treated by said apparatus and a characteristic related to the average conductivity of said source fluid and initiates regeneration as a function of the approximate number of grains processed by said ion exchange material.

15. The apparatus of claim 9 wherein said fluid treatment apparatus is an ion exchange section of a deionization apparatus.

16. The apparatus of claim 9 wherein said fluid treatment apparatus forms part of a water softener system.

17. A fluid treatment apparatus, comprising:
a) structure defining a chamber containing an ion exchange material, said structure further defining an input for admitting influent into said chamber and an output for discharging fluid treated by said ion exchange material;
b) regeneration means for regenerating said ion exchange material;
c) control means for initiating said regeneration means, said control means including
 i) parameter monitoring means for monitoring a predetermined parameter of said influent;
 ii) flow sensing means for monitoring the quantity of influent admitted into said chamber;
 iii) means for determining that said ion exchange material has reached a predetermined level of exhaustion based on data received from said parameter monitoring means and said flow sensing means; and
 iv) said means for determining including a load factor compensating means operative to compensate for changes in capacity of said ion exchange material when influent having a relatively high TDS concentration is being processed.

18. The apparatus of claim 17 wherein said regeneration means comprises:
a) a control valve assembly including means for controlling a regeneration cycle for said ion exchange material;
b) said means for controlling having a servo valve system forming part of said control valve assembly, including;
 i) a regeneration cycle sequencer for controlling the application of fluid pressure to valve means forming part of said control valve assembly;
 ii) a turbine coupled to said sequencer for driving said sequencer through a regeneration cycle;
 iii) a regeneration initiating fluid nozzle operative to direct a fluid stream at said turbine to impart rotation to said turbine to initiate a regeneration cycle;
 iv) control means operative to control the communication of pressurized fluid to said nozzle when a regeneration cycle is to be initiated.

19. The apparatus of claim 17 wherein said parameter monitoring means monitors the conductivity of said influent.

20. The apparatus as claim 17 wherein said control means further includes means for calculating a total grains quantity conveyed to said chamber by said influent and further includes means for comparing said total grains quantity to a preset quantity to determine whether said total grain quantity is equal to or exceeds said preset quantity.

21. The apparatus of claim 17 wherein said regeneration control means comprises a programmable controller.

22. The apparatus of claim 21 wherein said programmable controller includes a plurality of intermediate counters, each of said counters being operative to store a predetermined conductivity range and said controller including incrementing means operative to increment one of said counters upon receiving conductivity data from said conductivity sensor, said controller further including a totalizer counter for accumulating total counts of said intermediate counters.

23. The apparatus of claim 22 wherein each of said intermediate counters includes means for assigning a preset count that each of said counters must reach before said totalizer counter is advanced, said preset counts being related to the number of grains present in said influent for a given conductivity range.

24. The apparatus of claim 23 including sampling means operative to sample the conductivity at predetermined volume intervals and said total grains is calculated by the following formula:

$$\text{Total Grains} = \int_0^t k(TDS)(\text{flow}) dt.$$

25. The apparatus of claim 24 including approximating means for evaluating the total grains formula using an approximation method.

26. A fluid treatment apparatus, comprising:
a) structure defining a chamber containing an ion exchange material, said structure further defining an input for admitting influent into said chamber and an output for discharging fluid treated by said ion exchange material;
b) regeneration means for regenerating said ion exchange material; and
c) a feed forward control means for initiating said regeneration means, said control means including
 i) parameter monitoring means for monitoring a predetermined parameter of said influent, said parameter being one that provides an indication of the total dissolved solids present in said influent;
 ii) flow sensing means for monitoring the quantity of influent admitted into said chamber;
 iii) means for determining that said ion exchange material has reached a predetermined level of exhaustion based on data received from said parameter monitoring means and said flow sensing means including means for maintaining a running total of total dissolved solids processed by said ion exchange material; and
 iv) said means for determining including a load factor compensating means operative to compensate for changes in capacity of said ion exchange material when influent having a relatively high TDS concentration is being processed.

27. In a fluid treatment apparatus including at least one tank containing an ion exchange material for treating a source fluid, a regeneration control apparatus, comprising:

a) a control valve assembly including means for controlling a regeneration cycle for said ion exchange material; and
b) said means having a servo valve system forming a part of said control valve assembly, including:
   i) a regeneration cycle sequencer for controlling the application of fluid pressure to valve means forming part of said control valve assembly;
   ii) a turbine coupled to said sequencer for driving said sequencer through a regeneration cycle after regeneration has been initiated;
   iii) a regeneration initiating fluid nozzle operative to direct a fluid stream at said turbine to impart rotation to said turbine to initiate a regeneration cycle;
   iv) a second nozzle located in an impinging relationship with said turbine such that said turbine is driven by a fluid stream emitted by said second nozzle;
   iv) control means operative to control the communication of pressurized fluid to said regeneration initiating nozzle when a regeneration cycle is to be initiated; and,
   v) said control means being further operative to communicate pressurized fluid to said second nozzle after an initial predetermined movement in said sequencer, imparted by said regeneration initiating nozzle.

* * * * *